Figure 1A:
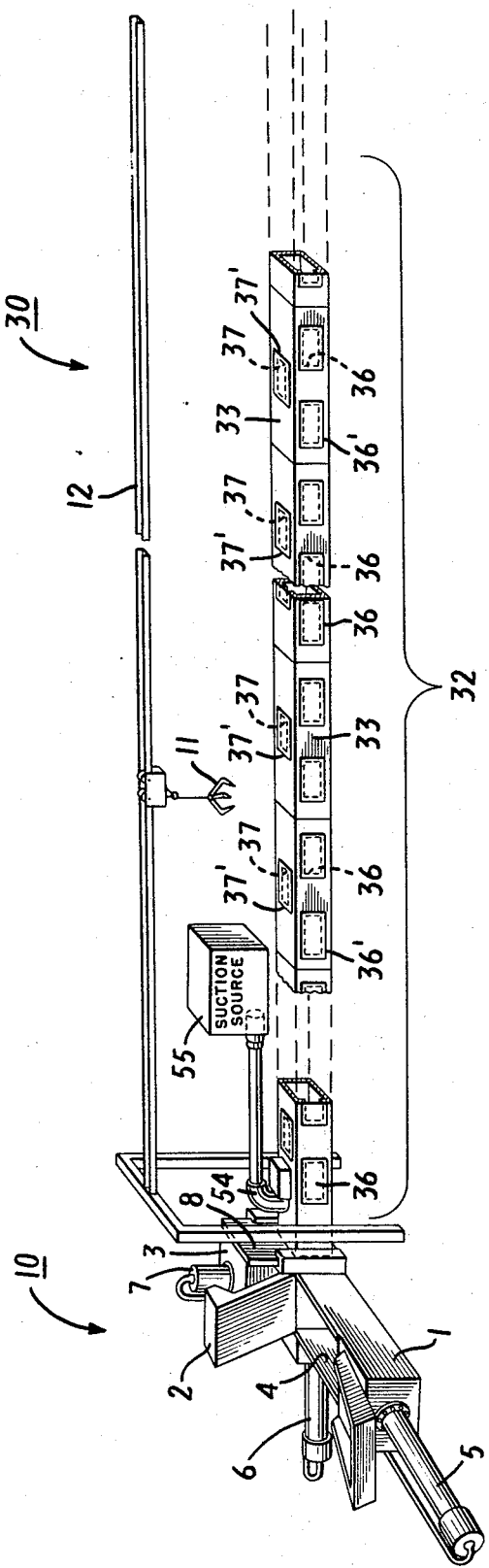

United States Patent [19]

George

[11] 3,768,739
[45] Oct. 30, 1973

[54] APPARATUS FOR FRAGMENTING SCRAP METAL

[76] Inventor: Robert Marie George, 2 Gaucet, Liege, Belgium

[22] Filed: Nov. 26, 1971

[21] Appl. No.: 202,293

Related U.S. Application Data

[63] Continuation-in-part of Ser. No. 828,283, May 27, 1969, Pat. No. 3,643,873.

[30] Foreign Application Priority Data

July 25, 1968 Belgium .............................. 41,857

[52] U.S. Cl. .................................. 241/65, 241/17
[51] Int. Cl. ......................................... B02c 21/00
[58] Field of Search ................... 241/17, 18, 23, 65

[56] References Cited
UNITED STATES PATENTS

| 3,666,185 | 5/1972 | Williams | 241/17 |
| 3,527,414 | 9/1970 | Schorsch | 241/23 |
| 3,614,001 | 10/1971 | Beike | 241/23 |
| 3,647,149 | 3/1972 | Horita et al. | 241/65 |

Primary Examiner—Granville Y. Custer, Jr.
Attorney—Robert E. Burns et al.

[57] ABSTRACT

Apparatus for fragmenting scrap metal comprises precompressing means for receiving the scrap metal and precompressing same into metal blocks, cooling means for cooling the blocks and rendering them sufficiently brittle to be fragmented, and fragmenting means for fragmenting the cooled blocks into pieces of scrap. The cooling means cools the blocks down to a temperature between −60° C. and −120° C. and preferably between −80° C. and −100° C. by contacting the blocks with liquid nitrogen whereupon the blocks are sufficiently embrittled so that they may be easily fragmented by either further compression, or by the application of crushing and/or hammering forces of sufficient strength to fracture the cooled blocks.

16 Claims, 2 Drawing Figures

APPARATUS FOR FRAGMENTING SCRAP METAL

The present application is a continuation-in-part of application Ser. No. 828,283 filed on May 27, 1969, now U.S. Pat. No. 3,643,873, issued on Feb. 22, 1972.

The present invention pertains to an apparatus for fragmenting scrap metal and more particularly, to an apparatus for fragmenting scrap metal composed principally of iron and iron alloy.

The quantity of waste material is constantly increasing and much research has gone into practical solutions for recovering and reusing waste material. In particular, it is the large size scrap material which poses the most problems since economical methods have not yet been developed to recover the numberous different types of materials which comprise automobile wrecks, outmoded household and industrial apparatus, and other industrial by-products.

It is therefore a primary object of the present invention to provide an apparatus for efficiently fragmenting scrap material composed mainly of metal.

Another object of the present invention is to provide a fragmenting apparatus for effecting fragmentation of scrap metal by first cooling the material to a brittle state and then effecting fragmentation of the brittle material by either compression, crushing, or other mechanical action.

The apparatus of the present invention comprises a precompressing stage, a cooling stage and a fragmenting stage. The precompressing stage may be either mobile or may be attached to the remainder of the apparatus and receives the scrap metal and compresses same into blocks. The cooling stage comprises an elongated cooling tunnel through which the blocks advance and wherein the blocks are cooled to render them sufficiently brittle to be easily fragmented. The fragmenting stage receives the cooled blocks and fragments them into pieces of scrap metal by applying either compressive forces or other mechanical fracturing forces to the cooled blocks, such as by means of a hammer-and-grid mill. The fragmented scrap is then fed to a sorter which sorts the fragmented scrap.

Figure 1B:
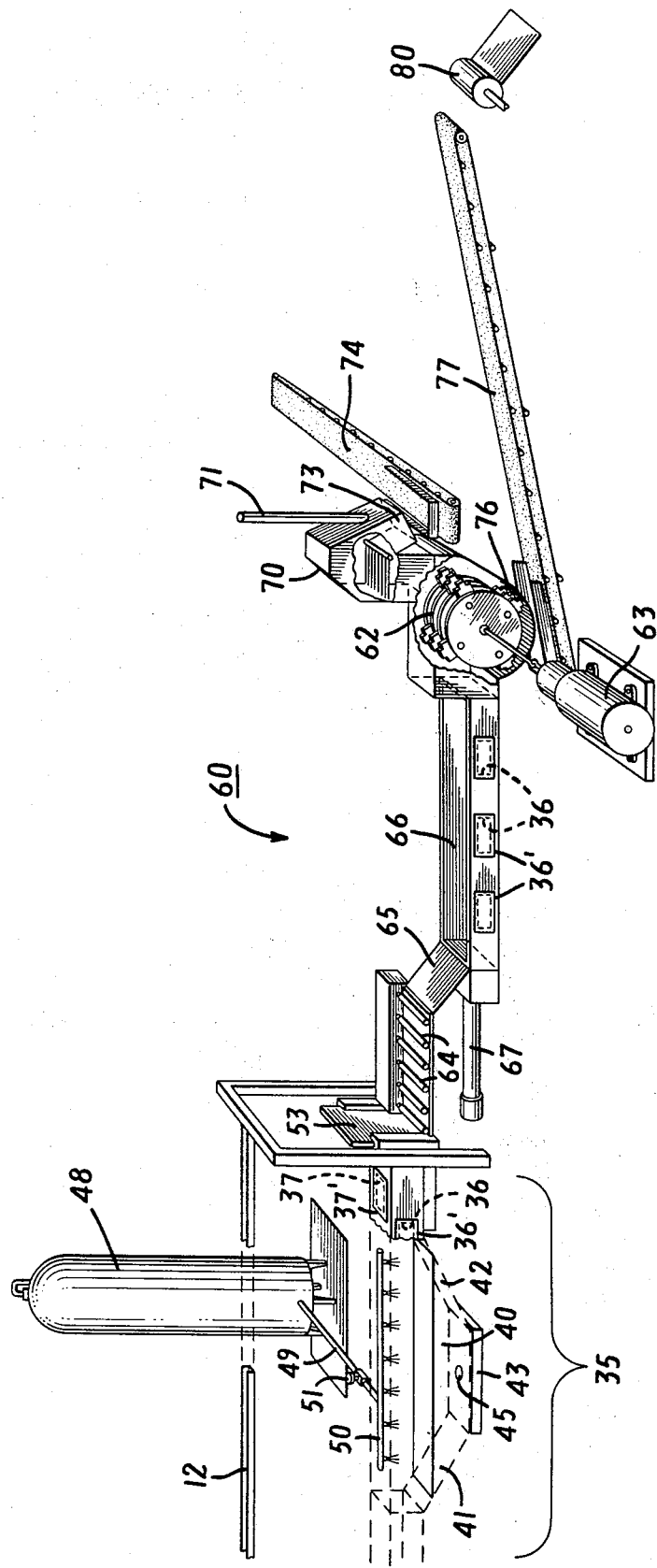

Other features and advantages of the fragmenting apparatus constructed in accordance with the principles of the present invention will be better understood when read in the light of the following specification and appended claims when taken in conjunction with the following drawings in which:

FIG. 1A is a diagrammatic view of the precompression stage and an upstream portion of the cooling stage of the fragmenting apparatus; and FIG. 1B is a diagrammatic view of the downstream portion of the cooling stage as well as the fragmenting stage of the apparatus of the present invention.

The fragmenting apparatus of the present invention comprises precompressing means 10 for receiving the scrap metal and precompressing same into blocks having numerous interstices therein, cooling means 30 for flowing a cooling medium through the interstices in the blocks to cool same and render them sufficiently brittle to be fragmented, and fragmenting means 60 for fragmenting the cooled blocks into pieces of scrap metal. Sorting means 80 may be provided downstream from the fragmenting means to receive and sort the fragmented metal according to either various sizes or the particular composition of the fragmented pieces.

The precompressing means 10 is shown in FIG. 1A and comprises a hopper 1 for receiving the scrap metal and a cover member 2 is pivotally mounted along one upper edge of the hopper 1. The hopper 1 has a material inlet opening 4 dimensioned to receive therethrough comparatively large size objects, such as entire automobiles and the like. One end wall of the hopper 1 opens into the interior of a stationary press housing 3.

A first piston-and-cylinder assembly 5 is connected to the other end wall of the hopper 1 and coacts with the hopper to advance the scrap material deposited in the hopper into the stationary press housing 3 while initially compressing the scrap material. A second piston-and-cylinder assembly 6 is disposed at a right angle with respect to the first piston-and-cylinder assembly and in the same horizontal plane therewith and is aligned along the longitudinal axis of the cooling means. A third piston-and-cylinder assembly 7 is mounted on top of the stationary press housing and effects vertical compressing of the scrap metal contained within the press housing.

The press housing 3 has an outlet opening and a vertically movable door 8 is mounted for vertical movement to open and close the outlet opening. The door 8 is mounted in vertical guideways which are of sufficient strength to withstand the forces exerted by the piston-and-cylinder assemblies, especially the second piston-and-cylinder assembly 6 which presses the material against the door. Automatic drive means may be employed to vertically raise and lower the door 8 or, as shown in the drawings, a hoist 11 may be employed to effect vertical movement of the door. The hoist 11 is mounted for horizontal movement along a guide rail 12 which extends along the entire length of the cooling means.

The precompressing means 10 operates in the following manner during one precompression cycle: scrap material which is to be fragmented is loaded into the hopper 1 through the material inlet opening 4 afterwhich the hopper door 2 is closed. The first piston-and-cylinder assembly 5 is actuated by suitable controls (not shown) to apply working fluid to the piston to extend same from the cylinder to effect partial compression of the scrap material accompanied by displacement of the scrap material into the press housing 3. Then the second and third piston-and-cylinder assemblies 6 and 7 are actuated to further compress and compact the scrap material in a horizontal and vertical direction, respectively.

The second working piston 6 compresses the scrap metal against the door 8 whereas the third working piston compresses the material in a vertical downward direction against the floor of the press housing whereupon the scrap metal is precompressed in three orthongonal directions by the three piston-and-cylinder assemblies and compacted into a block configuration having numerous interstices therein which later function as flow passages for the cooling medium. Upon the completion of the precompressing operation, the door 8 is raised and the second working piston is further extended to force the precompressed block of material into the cooling means 30 thereby terminating one precompression cycle.

The cooling means 30 comprises a precooling chamber 32 for receiving and precooling the precompressed blocks and a cooling chamber 35 for further cooling the precooled blocks. The precooling chamber 32 comprises an elongated cooling tunnel having a rectangular cross-sectional configuration. The cooling tunnel is composed of a series of connected together modular elements 33 having an interior surface of sheet steel, an intermediate layer of heat-insulating material, and an exterior layer of sheet steel. The sheet steel making up the inner layer is normally a thicker gauge than the sheet steel making up the outer layer and the intermediate insulating layer is composed of polyurethane foam or the like and has sufficient heat-insulating properties to preclude frosting of the exterior sheet steel casing.

Each modular element 33 is provided with a pair of inspection ports 36 provided in one side wall thereof and these ports are covered by a removable cover 36'. The inspection ports may be opened to remove dirt and other deposits which accumulate on the floor of the cooling tunnel during operation of the apparatus. Each modular element 33 is also provided with a large access opening 37 provided in the top thereof and this opening is of a sufficient size to allow the precompressed blocks to be withdrawn therethrough in case of temporary breakdown of the apparatus or in the event the blocks become jammed during their transit through the cooling tunnel. The access opening 37 is also provided with a removable cover 37' and all the removable covers have means for ensuring a fluidtight closing of their respective openings.

In addition, each modular element 33 is provided with a set of guide rails disposed on the base portion thereof to effectively guide the blocks through the cooling tunnel of the precooling chamber 32. The numerous modular elements 33 are welded together in end-to-end relationship and the guide rails in each modular element align with those in adjacent modular elements to form a guideway for the blocks.

Downstream from the precooling chamber 32 is located the cooling chamber 35. The cooling chamber 35 contains therein an immersion bath 40 of a cooling liquid medium in which the precooled blocks are totally or partially immersed. As seen in the FIG. 1B, the cooling chamber 35 comprises an extension of the cooling tunnel and has a downwardly inclined base portion 41, a horizontal base portion 43 and an upwardly inclined base portion 42 which define along with side walls a trough for containing the immersion bath 40.

The interior wall portions of the trough are formed of austenitic steel having a suitable thickness. Insulating material, such as polyurethane, is provided around the inner steel layer and a sheet steel casing is provided around the insulating much in the same manner as in the modular elements 33. The insulating layer should have sufficient thickness to prevent heat loss to the exterior and prevent frosting of the outer sheet steel casing.

The horizontal base portion 43 of the trough is provided with a drainage opening 45 to allow the cooling liquid to drain from the trough. A drainage valve (not shown) is provided on the underside of the horizontal base portion 43 to selectively drain cooling liquid from the trough thereby maintaining the level of the bath at a suitable valve to effect either partial or total immersion of the blocks during their advancement through the bath.

Cooling liquid supply means is provided atop the immersion bath 40 for supplying cooling liquid to the blocks during their advancement through the cooling chamber 35. The cooling liquid supply means comprises a storage tank 48 containing a cooling liquid medium, such as liquid nitrogen, and a distributing system connected to the storage tank for distributing the cooling liquid to the cooling chamber 35.

The distributing system comprises a conduit 49 connected to the storage tank and a conduit 50 connected to the conduit 49. The conduit 50 is provided therealong with a series of longitudinally spaced-apart nozzles to spray the cooling liquid in a diverging manner into the cooling chamber. A control valve 51 is provided in the conduit 49 for controlling the flow rate of cooling liquid through the distributing system and if desired, the control valve 51 may be operated in synchronism with the drainage valve to effect a continuous circulation of cooling liquid through the system.

The downstream portion of the cooling chamber 35 terminates in an outlet opening and a movable door 53 is provided to effect opening and closing of the outlet opening. The portion of the cooling chamber which is downstream from the upwardly inclined base portion 42 is at the same elevation as the remainder of the cooling tunnel located upstream from the cooling chamber. This downstream portion of the cooling chamber is provided along the base portion thereof with a series of rotationally driven rollers (not shown) for positively engaging with the cooled blocks and accordingly advancing them to the outlet opening. These rollers are formed of a material capable of withstanding the low temperatures of the cooled blocks, for example, austenitic steel. In addition, a clutch device, such as an electro-magnetic clutch, may be employed with the rollers to limit the driving torque of the rollers in the event the rollers become accidentally jammed by the cooled blocks.

Beneath the rollers is provided a removable drawer (not numbered) for receiving dirt and other debris which falls off the blocks as they advance over the rollers. The debris falls between the rollers and collects in the drawer which is periodically removed to dispose of the debris.

The top surface of the cooling chamber 35 is provided with a series of openings of a suitable size to allow the removal of the cooled blocks therethrough in the event of shutdown of the apparatus. Removable covers are mounted over the openings in a fluidtight manner similar to the covers 37' employed with the modular elements 33.

Suction means is employed to draw the cooling liquid vapors evolved in the cooling chamber 35 upstream through the precooling chamber 32. The suction means comprises a suction port provided in an upstream portion of the cooling tunnel and which is in communication with a source of suction. A conduit 54 interconnects the suction port with a source of suction 55. During operation of the cooling means, the cooling liquid is sprayed from the nozzles provided on the distributor conduit 50 and the vapors evolved during the cooling of the blocks are drawn through the precooling chamber by the suction source 55 to effect precooling of the blocks during their advancement to the cooling chamber.

In operation, the cooling means 30 effects cooling of the precompressed metal blocks in two stages and delivers the cooled blocks to the fragmenting means 60. As the precompressed blocks are delivered into the cooling chamber 32, cooling vapors are drawn through the precooling chamber and absorb heat from the blocks whereby the blocks are precooled. The blocks then advance through the cooling tunnel along the guide rails while progressively being cooled to a colder state until they reach the immersion bath 40. As the blocks advance through the immersion bath 40, they come in direct contact with the cooling liquid which flows through the numerous interstices in the blocks to effect chilling of the blocks to a temperature sufficient to render them brittle enough to be fragmented. The blocks are then advanced to the fragmenting means 60 which fragments the cooled blocks as will be hereinafter described.

The fragmenting means 60 effects fragmentation of the cooled blocks by either further compressing the blocks or fracturing the blocks by hammering and/or crushing them. In the embodiment shown in FIG. 1B, the fragmenting means comprises a mechanical crusher 62, such as a modified hammer-and-grid Newell crusher, for receiving and crushing the cooled blocks. The crusher 62 comprises a rotatable series of plate members having radially projecting crushing elements arranged around the periphery thereof. The plate members are rotationally driven by a drive mechanism 63.

The cooled blocks are transported to the crusher 62 by a conveying system comprising a series of rotatable rollers 64, a downwardly inclined surface 65 and a hopper 66. The rollers 64 are rotationally driven by a drive mechanism for positively feeding the chilled blocks to the inclined ramp 65. A piston-and-cylinder assembly 67 is provided at the leading end of the hopper 66 and the working piston is extended to displace the cooled blocks lengthwise through the hopper 66 into the crusher 62.

The crusher 62 is encased within a housing 70 having an exhaust stack 71. The exhaust stack 71 may be connected to a source of suction to continuously evacuate dust and small particles from the interior of the housing during operation of the crusher. The crusher housing has an upper portion 73 which opens onto a conveyor belt 74. A grid screen is provided in the upper portion 73 to ensure that only fragmented pieces of a preselected size fit through the grid screen and fall onto the conveyor belt 74. The crusher housing has a lower portion 76 having preselected grid openings along the bottom portion which open onto a conveyor belt 77.

During operation of the fragmenting means 60, the cooled blocks are conveyed by the conveying system to the crusher 62 and the crusher 62 is rotationally driven to subject the cooled blocks to crushing forces thereby reducing the cooled blocks to fragments of scrap metal. As the crusher mechanism rotates, the large nonferrous fragments, such as wires, cables, seat springs, etc. are expelled from the upper portion 73 of the housing 70 onto the conveyor belt 74 and the remaining scrap fragments are discharged from the lower portion 76 of the housing 70 onto the conveyor belt 77.

Sorting means 80 may be employed to sort the metal fragments according to either their size or composition. As shown in FIG. 1B, the sorting means comprises a magnetic sorting drum 80 positioned beneath and spaced-apart from the conveyor belt 77. A scraper blade is positioned adjacent the magnetic sorting drum 80 for scraping and removing the ferrous scrap fragments from the surface of the magnetic soring drum.

During operation of the apparatus, the scrap fragments of mixed composition are advanced by the conveyor belt 77 and fall in the space existing between the conveyor belt and the magnetic sorting drum 80. Those nonferrous scrap materials fall unhindered to a dumping area whereas the ferrous scrap material will magnetically adhere to the magnetic sorting drum 80.

As the magnetic sorting drum 80 rotates in a clockwise direction, the magnetic scrap material will be scraped from the drum by the scraper blade and be delivered to a collection area and this type of ferrous scrap is known as "cryogenic scrap iron."

In an alternative embodiment, the fragmenting means 60 may comprise another stage of compression. For example, the piston-and-cylinder assembly 67 may coact with a stationary wall provided in place of the crusher 62 to effect fragmentation of the chilled blocks. In such an arrangement, the cooling means would sufficiently cool the blocks and render them brittle enough to be fragmented upon further compression and in the case of ferrous scrap, such a temperature would be somewhere between −60° C. and −120° C. and preferably, between −80° C. and −100° C. The cooled blocks would then slide down the inclined surface 65 into the hopper 66 whereupon the piston-and-cylinder assembly 67 would be actuated to effect extension of the piston to further compress the cooled blocks against the stationary wall with sufficient force to fragment the block into pieces of scrap metal. Thus, the fragmenting means of the present invention may comprise another stage of compression in place of a hammering or crushing action as in the first embodiment.

The hoist 11 may be used to operate the inlet door 8 as well as the outlet door 53. In addition, the hoist 11 may be moved to any desired position along the cooling tunnel to effect removal of the blocks through the opening 37. The gripping mechanism of the hoist 11 is suitably dimensioned to fit through the openings 37 after the covers are removed and thus it may be appreciated that a single hoist mechanism is employed to control the movement of the blocks through the cooling means 30 as well as their removal from the cooling means if such becomes necessary.

In an alternative embodiment, the precompressing means 10 may comprise a mobile pressing assembly which may be transported from site to site. In such an embodiment, the scrap metal is precompressed into a block configuration by means of a mobile press assembly and the blocks are then transported to the cooling and fragmenting apparatus.

Though not shown in the drawings, suitable controls are employed for controlling the temperature within both the precooling chamber and the cooling chamber. These controls may comprise simply temperature detectors provided along the length of the cooling tunnel and the supply valve 51 and the drainage valve as well as the suction source may be manually controlled to regulate the temperature. Alternatively, automatic control means may be used to maintain the temperature in the cooling and precooling chambers at desired levels and such control devices are well known in the art and do not comprise part of the present invention.

The apparatus of the present invention enables a very efficient fragmenting operation to be carried out. For example, assuming that the cooling liquid comprises liquid nitrogen having a specific heat of 0.24 cal/kg and a heat of vaporization of 6 cal/kg., the following example will illustrate the efficiency of the present apparatus.

If liquid nitrogen is injected into the cooling chamber at a temperature of −195° C. and is exhausted from the precooling chamber 32 at a temperature of − 10° C., each kilogram of nitrogen will have liberated 6 + 0.24 × 185 = 50.4 calories. Since the main constituent of the scrap metal is iron which has a specific heat of 0.111 cal/kg., 1 kilogram of iron will be cooled from a temperature of from 20° C. to −90° C. by absorbing 110 × 0.111 = 12.1 calories. Thus one kilogram of nitrogen will reduce 4.16 kgs. of iron 110° C. at an efficiency of 100 percent. In actual practice, the efficiency has been found to be approximately 75 percent and therefore 1 kg. of nitrogen cools 3.1 kgs. of iron.

The above calculation does not take into account the amount of nitrogen used for cooling other metals and waste products contained in the scrap material but it should be noted that iron is the main constituent of the scrap metal question.

Other variations and modifications of the apparatus may be made without departing from the spirit and scope of the invention as defined in the appended claims.

What I claim and desire to secure by Letters Patent is:

1. An apparatus for fragmenting scrap metal comprising: precompressing means for receiving scrap metal to be fragmented and compressing same into blocks; cooling means disposed downstream from said precompressing means for receiving the blocks and sufficiently cooling same to render them brittle enough to fragment; and fragmenting means disposed downstream from said cooling means for receiving the cooled blocks and fragmenting them into pieces of scrap metal.

2. Apparatus acording to claim 1; wherein said cooling means includes means for at least partially immersing the blocks in a cooling liquid at a temperature between −60° C. and −120° C. to effect cooling and embrittlement of the blocks.

3. Apparatus according to claim 1; wherein said cooling means comprises a cooling chamber containing therein an immersion bath of a cooling liquid at a temperature between −60° C. and −120° C., a precooling chamber positioned upstream from and in communication with said cooling chamber, and suction means for creating a suction in the upstream end of said precooling chamber to draw cooling liquid vapors evolved in said cooling chamber upstream through said precooling chamber to precool blocks situated in said precooling chamber.

4. Apparatus according to claim 1; wherein said cooling means comprises an elongated cooling tunnel having an open upstream end adjacent said precompressing means and an open downstream end adjacent said fragmenting means, a first movable door movably mounted at said upstream end to effect opening and closing of said open upstream end, a second movable door movably mounted at said downstream end to effect opening and closing of said open downstream end, means in a downstream portion of said cooling tunnel defining a trough for receiving during use of the apparatus a cooling liquid, and suction means for creating a suction within said cooling tunnel effective to draw cooling liquid vapors evolved from the cooling liquid in an upstream direction through said cooling tunnel to precool the blocks prior to their entry into said trough.

5. Apparatus according to claim 4; wherein said cooling tunnel comprises a series of connected together modular elements, each said modular element having a hollow interior dimensioned to receive therethrough the blocks and having a heat-insulating material provided therearound to prevent heat loss, means defining inspection ports in at least some of said modular elements, and a cover member removably mounted over each said inspection port, whereby the cover members may be removed to enable dirt to be removed from the interior of said cooling tunnel.

6. Apparatus according to claim 5; wherein at least some of said modular elements have means therein defining an access opening dimensioned to allow therethrough one of the blocks, and a cover removably mounted over each access opening, whereby removal of the covers enables the blocks to be removed from said cooling tunnel through said access openings.

7. An apparatus according to claim 4; wherein said precompressing means includes a press housing having an inlet opening and an outlet opening aligned with said open upstream end of said cooling tunnel and separated therefrom by said first movable door, and a plurality of piston-and-cylinder assemblies coacting with said press housing to advance the scrap metal into said press housing and compress same into blocks.

8. Apparatus according to claim 7; including means locating one of said piston-and-cylinder assemblies in axial alignment with said first door whereby the piston is extendable and retractable in a direction towards and away from said first door, and means movably mounting said first door and having sufficient strength to enable said one piston-and-cylinder assembly to compress the scrap metal against said first door as a reaction surface.

9. Apparatus according to claim 1; wherein said fragmenting means comprises a mechanical crusher operable to apply crushing forces of sufficient strength to the cooled blocks to fragment them into pieces of scrap metal.

10. Apparatus according to claim 1; wherein said fragmenting means comprises compressing means for applying compressive forces of sufficient strength to the cooled blocks to fragment them into pieces of scrap metal.

11. Apparatus according to claim 1; including sorting means disposed downstream from said fragmenting means for receiving the pieces of scrap metal and sorting same according to their composition.

12. Apparatus according to claim 11; wherein said sorting means comprises a rotatable drum having a covering of magnetic material having sufficient magnetic attractive strength to attract thereto the ferrous scrap metal contained in the pieces of scrap metal, and means for removing the ferrous scrap metal from said drum during rotational movement thereof and delivering the ferrous scrap metal to a collection area; whereby the scrap metal is sorted into ferrous and non-ferrous pieces.

13. An apparatus according to claim 1; wherein said precompressing means comprises means for compressing the scrap metal into blocks having substantially the same configuration during every precompression cycle of said precompressing means.

14. An apparatus according to claim 13; wherein said lastmentioned means comprises means for compressing the scrap metal in three orthogonal directions during each precompression cycle.

15. An apparatus according to claim 3; wherein said precompressing means comprises means for compressing the scrap metal into blocks having substantially the same configuration during every precompression cycle of said precompressing means.

16. An apparatus according to claim 15; wherein said precooling chamber has an elongated configuration having interior cross-sectional dimensions slightly larger than the cross-sectional dimensions of the blocks to effect efficient precooling of the blocks.

* * * * *